(12) United States Patent
Clavey

(10) Patent No.: US 6,902,175 B1
(45) Date of Patent: Jun. 7, 2005

(54) MATERIAL HANDLING CART

(76) Inventor: Craig Clavey, 1906 Linneman, Glenview, IL (US) 60025

( * ) Notice: Subject to any disclaimer, the term of this patent is extended or adjusted under 35 U.S.C. 154(b) by 2 days.

(21) Appl. No.: 10/331,416

(22) Filed: Dec. 30, 2002

(51) Int. Cl.[7] .................................................. B62B 1/12
(52) U.S. Cl. ............................... 280/47.24; 280/47.19; 280/47.33; 280/63
(58) Field of Search ......................... 280/638, 35, 651, 280/652, 654, 655, 655.1, 659, 47.131, 47.17, 280/47.24, 47.315, 47.33, 63, 79.11, 79.3, 280/47.371, 43.1, 43.24, 47.19

(56) References Cited

U.S. PATENT DOCUMENTS

| | | | |
|---|---|---|---|
| 413,237 A | 10/1889 | Mattullath | |
| 1,343,197 A | 6/1920 | Daum | |
| 2,636,748 A | 4/1953 | Giovannoni | |
| 3,762,739 A * | 10/1973 | Tabet | 280/47.371 |
| 3,971,568 A * | 7/1976 | Wright | 280/33.996 |
| 4,165,088 A * | 8/1979 | Nelson | 280/47.35 |
| 4,335,990 A | 6/1982 | Apter et al. | |
| 4,705,280 A | 11/1987 | Burns | |
| 4,793,624 A | 12/1988 | Mace | |
| 4,998,742 A * | 3/1991 | Maynard | 280/35 |
| 5,328,192 A | 7/1994 | Thompson | |
| 5,536,034 A * | 7/1996 | Miller | 280/651 |
| 5,642,898 A * | 7/1997 | Wise | 280/652 |
| 5,779,252 A * | 7/1998 | Bolton, Jr. | 280/47.371 |
| 5,806,868 A | 9/1998 | Collins | |
| 5,853,189 A * | 12/1998 | Swartzlander | 280/652 |
| 6,206,385 B1 * | 3/2001 | Kern et al. | 280/47.35 |
| 6,308,968 B1 | 10/2001 | Hollingsworth | |
| 6,328,319 B1 | 12/2001 | Stahler | |
| 6,488,304 B2 * | 12/2002 | Krawczyk | 280/408 |
| 6,536,796 B1 * | 3/2003 | Solomon | 280/651 |

* cited by examiner

Primary Examiner—Christopher P. Ellis
Assistant Examiner—Brian Swenson
(74) Attorney, Agent, or Firm—Barnes & Thornburg

(57) ABSTRACT

The present invention provides a new material handling cart adapted for easy travel over uneven surfaces including a pair of independently extendable handles, and optionally having a convertible secondary deck assembly.

20 Claims, 2 Drawing Sheets

MATERIAL HANDLING CART

BACKGROUND OF THE INVENTION

1. Field of the Invention

The present invention relates material handling carts and more particularly to a new material handling cart adapted for use on and off of flat surfaces.

2. Description of the Prior Art

Material handling carts are well known in the prior art. Hardware and large home-improvement department stores often supply carts for use by their customers for carrying construction or home-improvement supplies, such as lumber. These carts generally consist of a pair of upright side rails supported on a horizontal deck, which in turn is carried by a plurality of wheels or casters.

While these known carts provide a means for transporting supplies, the known carts have several drawbacks. The known carts are provided with small diameter wheels or casters that, while providing relatively easy movement over hard, flat surfaces such as concrete floors and asphalt parking lots, are difficult or impossible to use in "off-road" conditions such as at construction sites or through loose gravel. The known carts are also equipped with stationary handles, which become difficult to reach when trying to move large and/or long materials and make maneuvering of the cart difficult around corners, such as at fence gates and doorways.

The known carts are also limited in the variety of materials that may be handled at one time. If a product to be moved is odd-shaped, then it becomes difficult to stack additional supplies on the cart for simultaneous transport. Thus, the customer or handler must make multiple trips to securely transport the different materials.

In these respects, there is a need for a material handling cart that is well adapted for travel over uneven ground and irregular surfaces, such as grass, dirt and gravel; which includes easily reachable handles; and further including a means for safely carrying multiple, different-shaped materials.

SUMMARY OF THE INVENTION

In view of the foregoing disadvantages inherent in the known material handling carts, the present invention provides a new material handling cart adapted for easy travel over uneven surfaces including a pair of independently extendable handles, and optionally having a convertible secondary deck assembly.

The material handling cart of the present invention generally comprises a primary deck supported on at least two, spaced apart, rotatable wheel assemblies. The cart further includes a first side-rail assembly connected to the primary deck at a first side and a second side-rail assembly connected to the primary deck at an opposing second side, each of which are adapted and positioned to prevent the lateral movement of objects transported by the material handling cart. Each of said first and second side-rail assemblies include an independently extendable handle assembly comprising a handle tube connected to the respective side-rail. The handle tube preferably has a longitudinal axis substantially perpendicular to the axis of rotation of the rotatable wheel assemblies. The handle tube includes an inner passage and an inner handle member adapted to be received and seated concentrically within the inner passage and further adapted to be selectively positioned therein. The inner handle member is preferably longer than the handle tube and adapted to be slidably seated within the inner passage of the handle tube. The inner handle member is further adapted to be adjustably positioned such that the inner handle member may extend outwardly from the handle tube. Preferably, each independently extendable handle assembly further includes a means for securing the inner handle member at a desired outwardly extending position.

Optionally, the cart may include a convertible secondary deck assembly. Preferably, the secondary deck assembly comprises a first convertible deck arm and second convertible deck arm. The first convertible deck arm includes a first end and a second end, the first end being pivotally connected to one of the first and second side-rails at a position vertically spaced from the primary deck and more preferably pivotally connected to a handle tube at a position vertically spaced from a first end of the primary deck. The first convertible deck arm is adapted to pivot about an axis substantially parallel to the longitudinal axis of the respective side-rail to which it is pivotally connected. The second end is adapted to make rotation-limiting engagement with the opposite side-rail at a position vertically spaced from the primary deck and preferably at a position vertically spaced from a first end of the primary deck.

The second convertible deck arm includes a third end and a fourth end, the third end being pivotally connected to one of the first and second side-rails at a position vertically spaced from the primary deck, more preferably pivotally connected to a handle tube at a position vertically spaced from the second end of the primary deck, and horizontally spaced from the first convertible deck arm. The second convertible deck arm is adapted to pivot about an axis substantially parallel to the longitudinal axis of the side-rails. The fourth end is adapted to make rotation-limiting engagement with the opposite side-rail to the side-rail which the third end is pivotally connected, preferably at a position vertically spaced from the second end of the primary deck and horizontally spaced from the first convertible deck arm. The first and second convertible deck arms may be pivotally connected to the same or different side-rails.

DETAILED DESCRIPTION OF THE INVENTION

Figure 1:
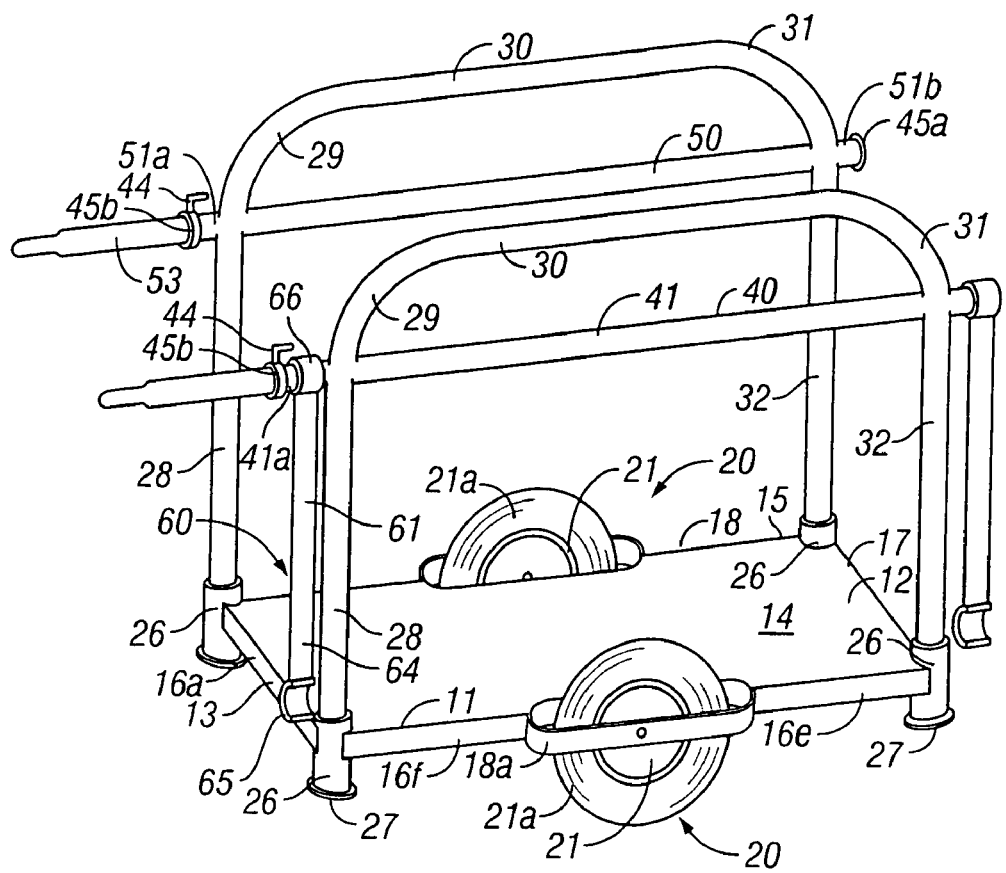
FIG. 1 is a perspective view of a material handling cart of the present invention.
Figure 3:
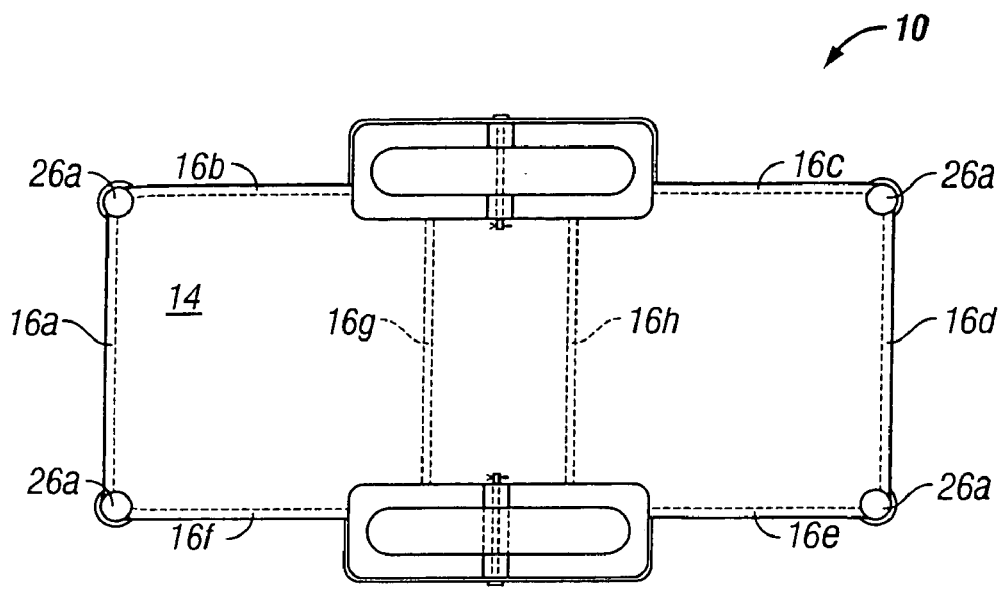
FIG. 3 is a top plan view of a material handling cart shown in FIG. 1 having the first and second side-rails removed.
Figure 4:
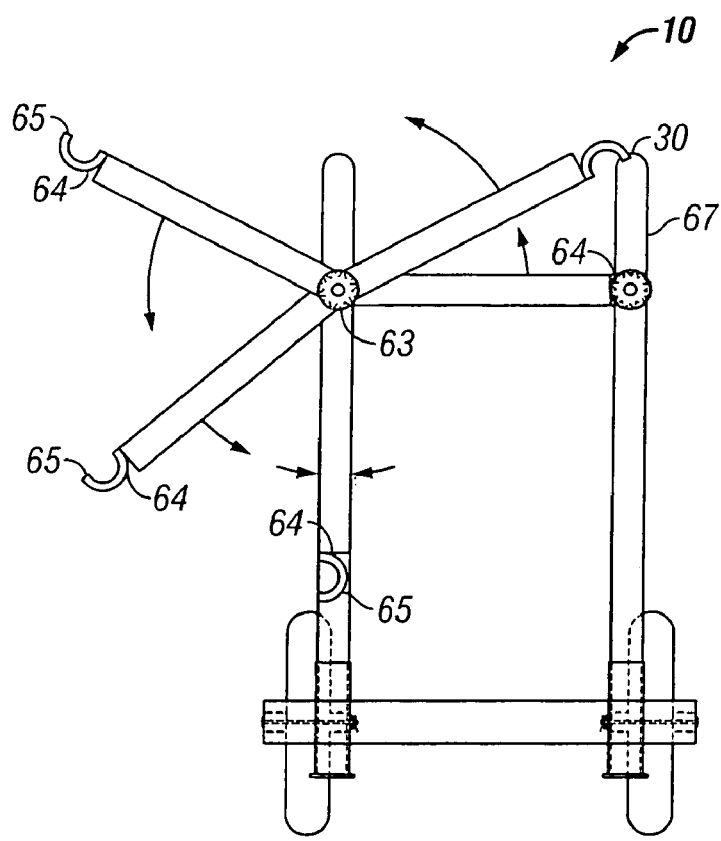
FIG. 4 is an rear end view of the material handling cart illustrated in FIG. 1.

A presently preferred embodiment of the invention is described below with reference to the drawings, in which like reference numerals refer to like elements in the various views. Referring to the drawings and particularly to FIGS. 1 and 4, there is illustrated a material handling cart, generally designated 10 having a first side 11, a front end 13, a rear end 15 and a second side 17. Generally, the material handling cart 10 includes a primary deck 12 including a floor panel 14 of a suitable material such as aluminum, plastic or other sheet material. Preferably, and as shown, the primary deck 12 and floor panel 14 are substantially rectangular. The dimensions may be any that are desired, but preferably, the width (distance between the first and second sides 11 and 17) is selected such that the material handling cart may be navigated through standard doorways and gate openings. Preferably, the primary deck includes support beams 16*a–f* (shown in phantom in FIG. 3) about the perimeter and across its lower width by support beams 16*g* and 16*h* to support the floor panel 14 and thereby reinforce the load carrying capacity of the deck 12.

The material handling cart 10 further includes at least two spaced apart wheel assemblies 20. The wheel assemblies 20 each include wheel support brackets 18 that are positioned at opposing sides of the primary deck 12 and are adapted to receive and support a wheel 21. Preferably, the wheel assemblies are positioned centrally to the length of the primary deck 12 such that loads are easily centered and balanced for transport. The wheel assemblies 20 preferably include a rubber tire 21*a* having a sufficient diameter to allow the material handling cart 10 to be navigated over rough terrain, such as gravel, and that easily passes over uneven surfaces.

Figure 2:
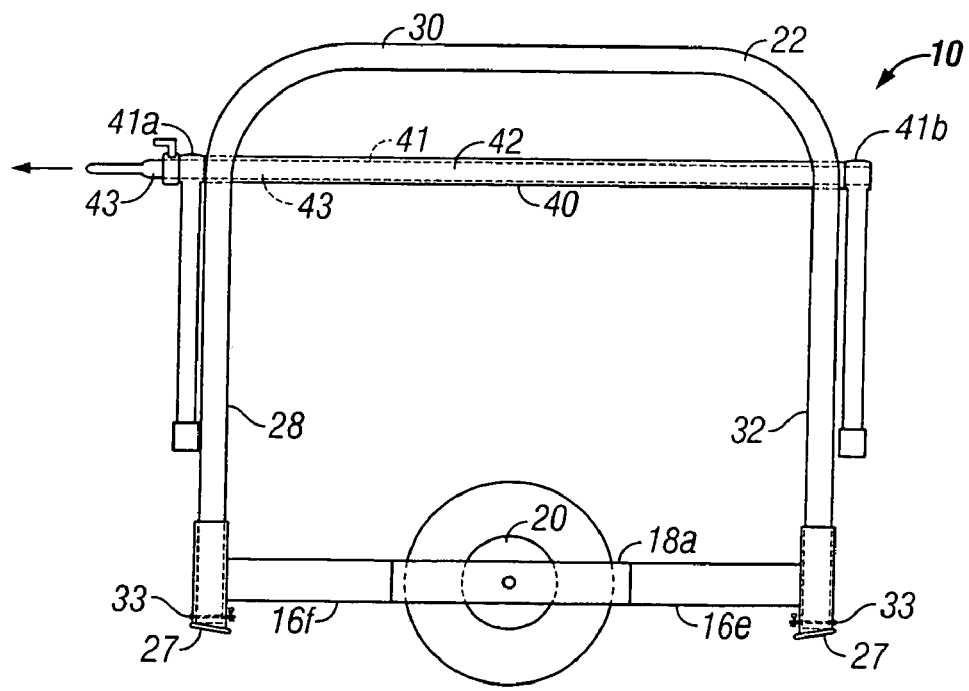
FIG. 2 is a side view of a material handling cart depicted in FIG. 1.

The material handling cart 10 further includes a first side-rail assembly 22 and a second side-rail 24. The first and second side-rails 22 and 24 are connected to the primary deck 12 at opposing sides and preferably have longitudinal axis parallel to the rotation axis of the wheels 21. The first and second side-rails 22 and 24 are preferably made of a suitable material such as aluminum pipe, although other materials such as wood and plastic may be used. Any configuration of the side-rails is suitable so long as the side-rails provide for the lateral containment of objects being transported by the material handling cart 10. The first and second side-rails 22 and 24 are shown in a substantially inverted U-shape configuration; however, such a shape is merely a preference and other shapes are readily envisioned. Preferably, as shown in FIGS. 1–2, the first and second side-rails 22 and 24 each comprise a substantially continuous metal pipe having a front leg 28, a front corner 29, a top rail 30, a rear corner 31 and a rear leg 32. Optionally, the side-rails may be fitted with a mesh, screen or sheet wall (none shown) so that small items that otherwise might pass laterally through the space between the front leg 28, rear leg 32, primary deck 12 and top rail 30 are contained. Likewise, a suitable mesh, screen or wall may be fitted between the front leg 28 of the first side-rail 22 and the front leg 28 of the second side-rail, or between the rear legs 32 for similar function.

The first and second side-rails 22 and 24 are preferably removably connected to the primary deck 12. This is accomplished by providing a plurality of support sleeves 26 that are rigidly connected to the primary deck 12. Each of the plurality of support sleeves 26 include a cavity 26*a* (seen in FIG. 3) having an inner diameter greater than the outer diameter of the pipe or other material from which the side-rails 22 and 24 are fashioned. The plurality of support sleeves 26 are appropriately spaced and each are adapted to receive a leg of the side-rails 22 and 24. As best illustrated in FIG. 2, the support sleeves 26 each preferably include a shoe member 27 that closes the bottom of the support sleeve 26. When the legs 28 and 32 of the side-rails 22 and 24 are inserted into the support sleeves, the bottoms of the front and rear legs 28 and 32 rest in the support sleeves 26 on the shoe members 27. A retaining pin 33 may be provided that can be inserted through complimentary apertures in the support sleeves 26 and respective legs 28 and 32 to prevent the unwanted removal of the side-rails 22 and 24. The shoe members 27 are preferably inclined such that when the material handling cart is allowed to rest upon a surface, the underside of the shoe member 27 engages the surface over substantially its entire lower surface area. In other words, the inclination of the shoe members 27 provide for increased contact with the surface and thereby reduces the risk of slipping or rolling, especially when the cart is brought to rest on an incline, since the underside of the shoe members 27 rest flat on the surface. Optionally, each of the shoe members 27 may be fitted with a rubber sole to increase the friction with the support surface and/or to prevent scratching of flooring surfaces.

Each of the first and second side-rail assemblies 22 and 24 include an independently extendable handle assembly 40, which is best illustrated in FIG. 2. For ease of illustration, the description of the independently extendable handle assembly 40 will be made with respect to the first side-rail assembly 22; however, such description is equally applicable to the independently extendable handle assembly 40 of the second side-rail assembly 24. The independently extendable handle assembly 40 comprises a handle tube 41 connected to the first side-rail 22 and preferably includes a longitudinal axis substantially perpendicular to the axis of rotation of the rotatable wheel assemblies 20. Preferably, the handle tube 41 extends parallel to the primary deck 12 and the full length of the first side-rail 22. Preferably, the handle tube 41 includes a first portion 41*a* and second portion 41*b* that extend outwardly beyond the front leg 28 and rear leg 32 respectively for reasons that will become more apparent below. The handle tube 41 includes an inner passage 42 (shown in phantom lines in FIG. 2) extending substantially the length thereof and adapted to receive a inner handle member 43. The inner handle member 43 comprises a rod or tube having an outer diameter less than the inner diameter of the handle tube 41 such that the inner handle member 43 may be slidably received by the handle tube 41. The inner handle member 43 is preferably longer than the handle tube 41 and is further adapted to be adjustably positioned such that the inner handle member 43 may extend outwardly form the handle tube 41 a desirable amount. A rear stop 45*a* may be provided on the handle tube 41 to prevent the inner handle member 43 from extending beyond the rear end of the handle assembly 40. Preferably, the independently extendable handle assembly 40 further includes a means for adjustably securing the inner handle member 43 at desired outwardly extending positions, such as a hand-turnable setscrew 44 extending through a front stop collar 45*b*. Alternatively, the inner handle member 43 could be provided with a plurality of longitudinally spaced apertures that could be independently aligned with a complimentary aperture provided through the stop collar 45. In such a case, a pin could then be placed through the aligned apertures to secure the inner handle member 43 in a selected position.

In another embodiment of the invention (not illustrated), the handle tube 41 is open at both ends and both the front and rear ends include a means for securing the inner handle member 43. The inner handle member 43 may then be selectively extended from either end of the cart 10. Thus, one inner handle member 43 could be extended and secured outwardly from the front end 13, while the other inner handle member 43 is extended outwardly and secured at the rear end 15. This feature doubles the usable length of the cart 10 by allowing one operator to push on an inner handle member while a second operator pulls on the opposite inner handle member.

Optionally, the material handling cart 10 further includes a convertible secondary deck assembly, shown generally at 60. The secondary deck assembly 60 comprises a first convertible deck arm 61 and second convertible deck arm 62. The first convertible deck arm 61 preferably is comprised of similar material to the side-rails and includes a first end 63 and a second end 64. As best shown in FIG. 1, the first end 63 is pivotably connected to the first side-rail assembly 22 at a position vertically spaced from the primary deck 12, and more preferably pivotably connected to the first portion 41a of the handle tube 41 at a position vertically spaced from the front end 13 of the primary deck 12. However, the first convertible deck arm 61 may also be connected to the top rail 30 or any other position on a side-rail. In FIGS. 1 and 2, the first end 63 includes a deck arm sleeve 66 that is adapted to fit over and around the handle tube 41 at the first projection 41a. In other words, the deck arm sleeve 66 includes a passage having an inner diameter greater than the outer diameter of the handle tube 41. The first convertible deck arm 61 is retained on the handle tube 41 by stop collar 45a. Thus, the deck arm 61 can rotate freely about the handle tube 41. As the skilled artisan will appreciate, the first convertible deck arm 61 may be pivotably attached to either the first side-rail 22 or the second side-rail 24. The second end 64 is adapted to make rotation-limiting engagement with the second side-rail 24. Preferably, the second end 64 includes an engagement bracket 65 that enables the first convertible deck arm 61 to rest on the opposing side-rail in a substantially horizontal position. The engagement bracket 65 may take any form, such as an L-bracket as shown in FIG. 4 or a semi-circular bracket having a central axis parallel to the handle tube, as shown in FIG. 1. The engagement bracket 65 ensures that the first convertible deck arm 61 has a length greater than the distance between the first and second side rails 22 and 24. Thus, the deck arm 61 may pivot about the first end 63 until the second end 64 engages the opposing side rail and may rest thereupon.

The second convertible deck arm 62 is preferably comprised of similar material as the side-rails and includes a first end 63 and a second end 64 identical to that described for the first convertible deck arm 61. As best shown in FIGS. 1 and 2, the first end 63 is pivotably connected to the first side-rail assembly 22 at a position vertically spaced from the primary deck 12, and more preferably pivotably connected to the second portion 41b of the handle tube 41 at a position vertically spaced from the rear end 17 of the primary deck 12. However, the first convertible deck arm 61 may also be connected to the top rail 30 or any other position on a side-rail. In FIGS. 1 and 2, the first end 63 includes a deck arm sleeve 66 that is adapted to fit over and around the handle tube 41 at the second portion 41b and is retained on the handle tube by the rear stop 45a.

The first and second deck arms 61 and 62 may also be connected together by a cross arm (not illustrated) that would provide for the simultaneous pivoting of both arms. Thus, an operator may engage the convertible secondary deck assembly by manipulating only the closest deck arm. A plurality of such cross arms or mech screen may be provided to create a basket-like secondary deck. When not engaged by and resting upon the opposing side rail, the first and second convertible deck arms 61 and 62 hang parallel to the front and rear legs 28 and 32. Optionally, the front and rear legs 28 and 32 may include a retaining element (not shown) to prevent the arms 61 and 62 from swinging freely when not in use.

While various features of the invention have been particularly shown and described in connection with the illustrated embodiments of the invention, it must be understood that these particular arrangements merely illustrate, and that the invention is to be given its fullest interpretation within the terms of the appended claims.

What is claimed is:

1. A cart for transporting objects, said cart comprising:
   a primary deck;
   at least two wheel assemblies, said at least two wheel assemblies positioned on opposite sides of said primary deck, said wheel assemblies adapted to support said primary deck above a support surface;
   a first side-rail assembly and a second side rail assembly, said first and second side-rail assemblies positioned at opposing sides of said primary deck and extending above said primary deck; and,
   wherein each of said first and second side-rail assemblies include an independently extendable handle assembly wherein each independently extendable handle assembly is adjustable to extend at varying lengths horizontally beyond said primary deck.

2. The cart according to claim 1, wherein said first and second side-rail assemblies are removably connected to said primary deck.

3. The cart according to claim 1, wherein said independently extendable handle assembly comprises a handle tube and an inner handle member, said inner handle member adapted to be slidably received within said handle tube.

4. The cart according to claim 3, wherein said independently extendable handle assembly includes a means for adjustably securing the inner handle member at different extended positions from said handle tube.

5. The cart according to claim 4, wherein said means for securing comprises a setscrew.

6. The cart according to claim 3, wherein said inner handle member is adapted to adjustably extend from either end of said handle tube.

7. The cart according to claim 3, wherein said handle tube includes a rear stop adapted to prevent said inner handle member from extending from the rear of said handle tube.

8. The cart according to claim 1, wherein said first and second side-rail assemblies comprise an inverted U-shape and include a front leg, a front corner, a top rail, a rear corner and a rear leg, said front and rear legs adapted to be removably connected to said primary deck.

9. The cart according to claim 8, wherein each of said independently extendable handle assemblies are attached to the first and second side-rail assemblies at a position vertically spaced from said top rail.

10. A cart for transporting objects, said cart comprising:
    a primary deck;
    at least two wheel assemblies, said at least two wheel assemblies positioned on opposite sides of said primary deck, said wheel assemblies adapted to support said primary deck above a support surface;
    a first side-rail assembly and a second side rail assembly, said first and second side-rail assemblies positioned at opposing sides of said primary deck; and,
    a convertible secondary deck assembly, said convertible secondary deck assembly including a first deck arm and a second deck arm, each of said first and second deck arms having a first end pivotably connected to one of said first and second side-rails and a second end adapted to make rotational-limiting engagement with the other one of the first and second side-rails, said first and second deck arms being independently pivotable with respect to the other one of the first and second deck arms.

11. The cart according to claim 10, wherein said first and second side-rail assemblies each include an independently extendable handle assembly.

12. The cart according to claim 11, wherein said independently extendable handle assembly includes a handle tube and an inner handle member, said inner handle member adapted to be slidably received within said handle tube; and, said first end comprises a sleeve adapted to be slidably fitted around said handle tube, whereby said first deck arm may pivot about said handle tube.

13. The cart according to claim 10, wherein said first and second side-rail assemblies are removably connected to said primary deck.

14. The cart according to claim 12, wherein said first and second side-rail assemblies comprise an inverted U-shape and include a front leg, a front corner, a top rail, a rear corner and a rear leg; said handle tube of each independently extendable handle assembly is affixed to said front leg and said rear leg of the respective side-rail assembly, said handle tube including a first portion extending outwardly beyond said front leg and a second portion extending outwardly beyond said second leg.

15. The cart according to claim 14, wherein said first end of said first deck arm is pivotably connected to said first portion of said first side-rail assembly and said second end is adapted to make rotational-limiting engagement with said first portion of said second side-rail assembly.

16. The cart according to claim 14, wherein said first end of said second deck arm is pivotably connected to said second portion of said first side-rail and said second end is adapted to make rotational-limiting engagement with said second portion of said second side-rail.

17. A cart for transporting objects, said cart comprising:
a primary deck;
two wheel assemblies, said two wheel assemblies positioned on opposite sides of said primary deck, said wheel assemblies adapted to support said primary deck above a surface;
a first side-rail assembly and a second side rail assembly, said first and second side-rail assemblies positioned at opposing sides of said primary deck, each of said first and second side-rail assemblies including an independently extendable handle assembly extendable to varying lengths independent of the independently extendable handle assembly of the other one of the first and second side-rail assemblies; and,
a convertible secondary deck assembly, said convertible secondary deck assembly including a first deck arm and a second deck arm, each of said first and second deck arms having a first end pivotably connected to one of said first and second side-rail assemblies and a second end adapted to make rotational-limiting engagement with the opposing side-rail assembly.

18. The cart according to claim 17, wherein said first and second side-rail assemblies are removably attached to said primary deck.

19. The cart according to claim 17, wherein said independently extendable handle assembly includes a handle tube and an inner handle member slidably received within said handle tube.

20. The cart according to claim 19, wherein said independently extendable handle assembly includes a means for securing said inner handle member at different positions extending from said handle tube.

* * * * *